United States Patent
Park et al.

(10) Patent No.: US 7,620,813 B2
(45) Date of Patent: Nov. 17, 2009

(54) METHOD TO AUTHENTICATE A DATA PROCESSING APPARATUS HAVING A RECORDING DEVICE AND APPARATUSES THEREFOR

(75) Inventors: Jong-lak Park, Suwon-si (KR); Seung-youl Jeong, Hwaseong-gun (KR); Hak-yeol Sohn, Seoul (KR); Sung-yon Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 651 days.

(21) Appl. No.: 10/875,677

(22) Filed: Jun. 25, 2004

(65) Prior Publication Data
US 2005/0021958 A1    Jan. 27, 2005

(30) Foreign Application Priority Data
Jun. 26, 2003    (KR)    ....................... 10-2003-0042138

(51) Int. Cl.
H04L 9/32    (2006.01)
G06F 21/20    (2006.01)
(52) U.S. Cl. ...................................... 713/169; 713/189
(58) Field of Classification Search ................. 713/169, 713/189
See application file for complete search history.

(56) References Cited

U.S. PATENT DOCUMENTS

| 5,590,202 | A |   | 12/1996 | Bestler et al. |         |
|-----------|---|---|---------|----------------|---------|
| 6,058,476 | A | * | 5/2000  | Matsuzaki et al. | 713/169 |
| 6,073,236 | A | * | 6/2000  | Kusakabe et al. | 713/169 |

(Continued)

FOREIGN PATENT DOCUMENTS

EP    1 124 350    8/2001

(Continued)

OTHER PUBLICATIONS

A. Menezes et al. "Handbook of Appied Cryptography" © 1997 CRC Press. pp. 397-405.*

(Continued)

*Primary Examiner*—Kimyen Vu
*Assistant Examiner*—Thomas Gyorfi
(74) *Attorney, Agent, or Firm*—Staas & Halsey LLP (57) ABSTRACT

A method and apparatus to authenticate a data processing apparatus having a recording device, according to which recording data to and restoring data from only an authenticated recording device can be performed. The authentication method to ensure legally recording of data to and/reproducing of data from a recording device in a data processing apparatus having a host to process data and the recording device to store and reproduce data processed or to be processed by the host, includes authenticating the recording device via the host; authenticating the host via the recording device; and performing recording of data to and/or reproducing of data from the recording device upon determining that the host and the recording device have authenticated each other. According to the authentication method, in a data processing apparatus having a recording device to record and/or store data, only when a host and the recording device authenticate each other, access to the recording device is permitted, that is, recording and/or restoring data is enabled such that illegal use of data or use of data by an unauthorized user can be prevented.

38 Claims, 6 Drawing Sheets

U.S. PATENT DOCUMENTS

| | | | |
|---|---|---|---|
| 6,778,757 B1 * | 8/2004 | Kawamae et al. | 386/94 |
| 7,055,031 B2 * | 5/2006 | Platt | 713/168 |
| 7,076,666 B2 * | 7/2006 | Unger et al. | 713/189 |
| 2004/0177369 A1 * | 9/2004 | Akins, III | 725/31 |

FOREIGN PATENT DOCUMENTS

| | | |
|---|---|---|
| JP | 07161172 | 6/1995 |
| JP | 10-285155 | 10/1998 |
| JP | 2000-124890 | 4/2000 |
| JP | 2000-224161 | 8/2000 |
| JP | 2000-298942 | 10/2000 |
| JP | 2002-281023 | 9/2002 |
| JP | 2003-018151 | 1/2003 |
| KR | 2002-71268 | 9/2002 |
| KR | 2003-0014673 | 2/2003 |

OTHER PUBLICATIONS

B. Schneier. "Applied Cryptography, $2^{nd}$ Edition" © 1996 Bruce Schneier. pp. 53-55.*

Scientific Atlanta Explorer Home Meida Server. © 2002 Scientific Atlanta Inc.*

Full text of "Handbook of Applied Cryptography" by Menenzes et al. © 1996 CRC Press. (780 pages).*

Additional Excerpt from "Applied Cryptography, $2^{nd}$ Edition" by Bruce Schneier © 1996 (p. 56).*

Chinese Office Action for Application No. 2004100620725; dated Jul. 28, 2006.

Japanese Office Action for Application No. 2004-189923; dated Oct. 17, 2006.

European Search Report for Application No. EP 04 01 5158, dated May 6, 2005.

Korean Office Action issued on Aug. 22, 2005 for application No. 10-2003-0042138 (4 pgs).

* cited by examiner

METHOD TO AUTHENTICATE A DATA PROCESSING APPARATUS HAVING A RECORDING DEVICE AND APPARATUSES THEREFOR

CROSS-REFERENCE TO RELATED APPLICATIONS

This application claims the benefit of Korean Patent Application No. 2003-42138, filed Jun. 26, 2003, in the Korean Intellectual Property Office, the disclosure of which is incorporated herein by reference.

BACKGROUND OF THE INVENTION

1. Field of the Invention

The present invention relates to a data processing apparatus having a recording medium to which data can be recorded, and more particularly, to an authentication method according to which recording data to and restoring data from an authenticated recording device is performed.

2. Description of the Related Art

Video signal reception apparatuses having a recording medium to which a video signal can be stored include: a set-top box having a hard disc drive (HDD), a CD recording device, or a DVD recording device, a personal video recorder (PVR), a monitor, a personal computer (PC), and a VCR.

A set-top box is usually used in video on demand (VOD) services, which enable a user to watch a desired program any time by directly selecting contents stored in a media database (MDB), unlike the unilateral method by which the present broadcasting stations deliver programs to viewers. The basic system for this VOD service comprises a video source system (VSS), which has a mounted video server apparatus, a set-top box, which is the user terminal apparatus, and network equipment.

Figure 1:
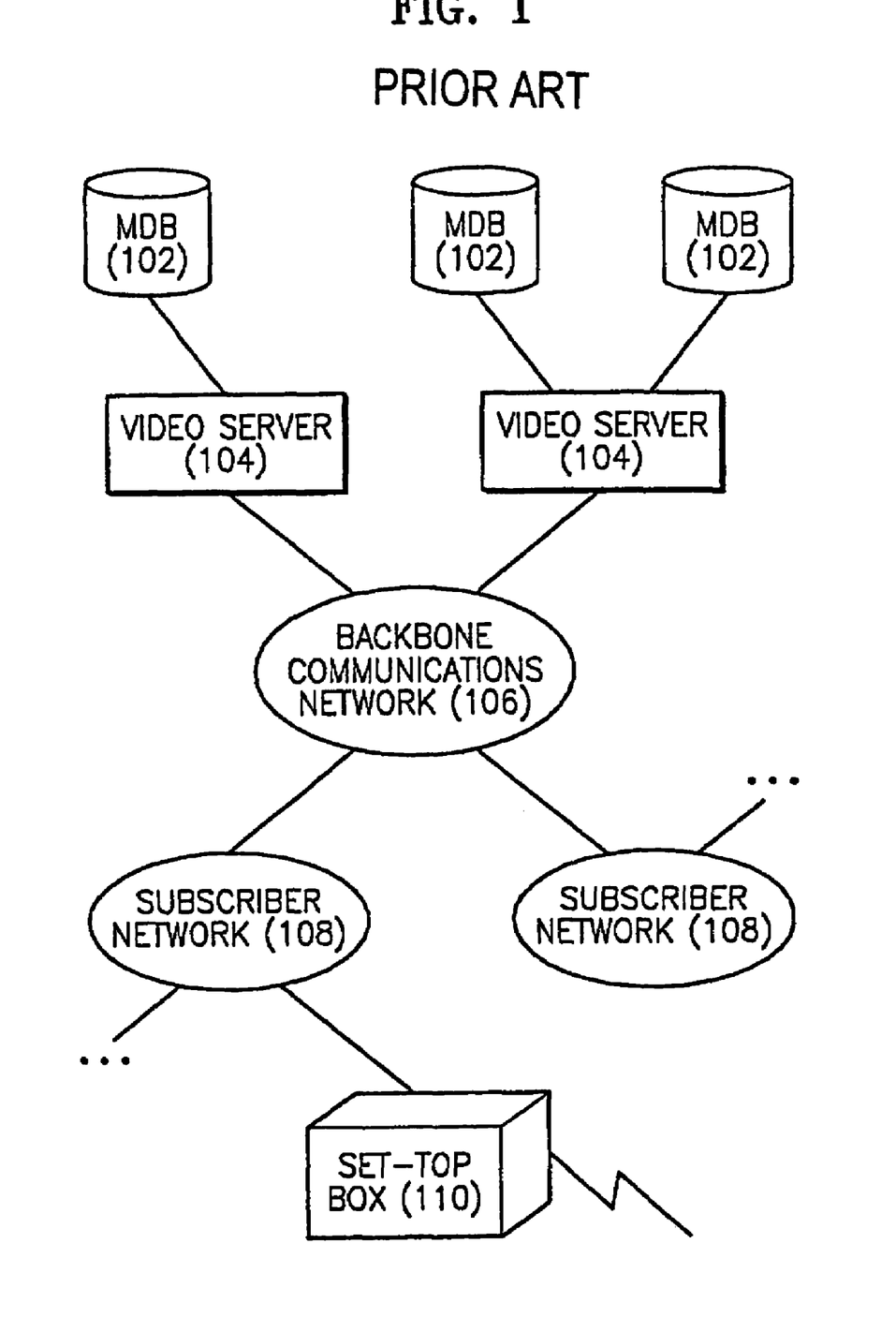
FIG. 1 is a schematic diagram of a general structure of video on demand (VOD) services.

FIG. 1 is a schematic diagram of a general structure of a VOD service.

The system for the VOD service comprises: MDB 102, a video server 104, a backbone communications network 106, subscriber networks 108, and a set-top box 110.

The video server 104 performs functions including, reception, handling, and management of user requests, storing large amount of digital video data, multiple I/O functions, database management functions, and fault recovery.

The set-top box (STB) 110 performs functions, such as, connection of subscriber networks and users, restoring video data from compressed data, and security and reservation functions.

Korean Laid-Open Patent Application No. 1997-4852 (laid open Jan. 29, 1997) discusses a set-top box capable of storing VOD service data. Accordingly, VOD service data provided by a service provider is stored in an HDD, and after connection to the provider is terminated, the VOD service data stored in the HDD can be reproduced at a desired time.

Figure 2:
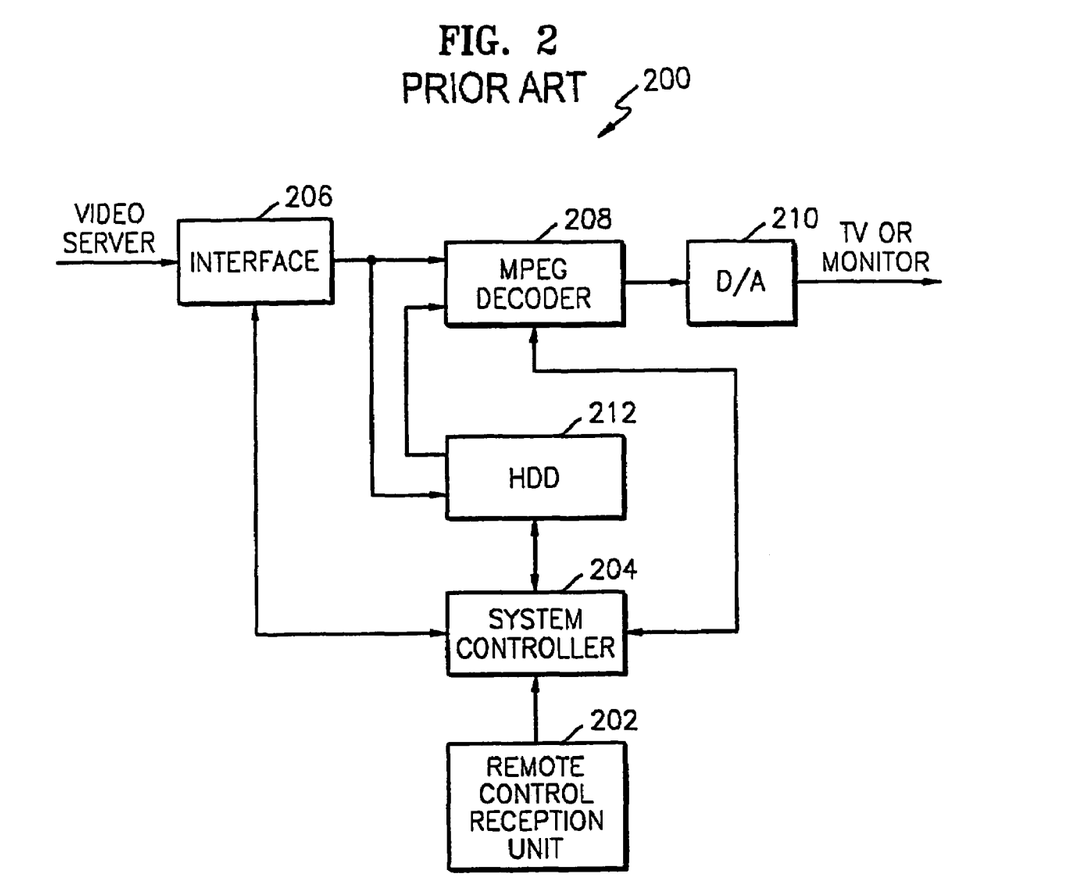
FIG. 2 is a schematic diagram of an example of a set-top box having a hard disc drive (HDD)

FIG. 2 is a schematic diagram of an exemplary set-top box having an HDD.

The set-top box shown in FIG. 2 comprises: a system controller 204, which controls the operation of the set-top box 200 according to a user control command received through a remote controller reception unit 202, an interface 206 which interfaces the video server 104 shown in FIG. 1 via control of the system controller 204, an MPEG decoder 208 which decodes the data compressed in compliance with the MPEG format and transmitted by the video server 104 to restore video and voice data, a digital-to-analog (D/A) conversion unit 210 which converts the video and voice data reproduced by the MPEG decoder 208 into an analog signal so that the data can be output through a TV or a monitor, and an HDD 212 which stores the MPEG compressed data and transmitted by the video server 104 or reproduces the stored MPEG compressed data and provides to the MPEG decoder 208.

The apparatus shown in FIG. 2 stores the VOD service data provided by the video server 104, and after the connection to the video server 104 is terminated, enables the VOD service to allow data stored in the HDD to be reproduced by a user.

Korean Laid-Open Patent Application No. 2002-71268 (laid open Sep. 12, 2002) discusses an apparatus and method to prevent illegal use of VOD services. Accordingly, illegal access and unauthorized use by non-subscriber users of VOD service data provided to paid subscribers can be prevented.

Figure 3:
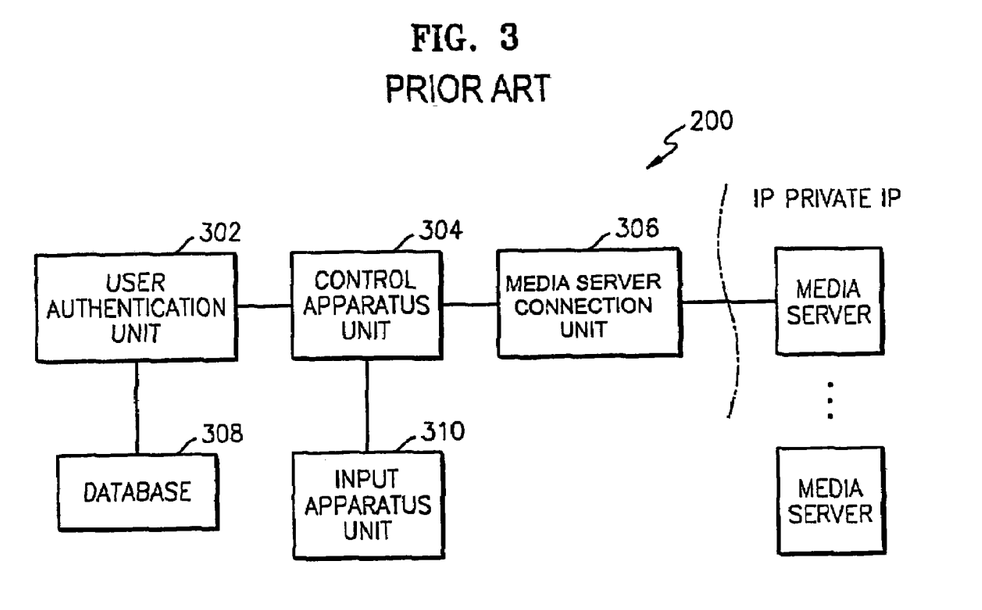
FIG. 3 is a diagram of the structure of an apparatus to prevent illegal use.

FIG. 3 is a diagram of the structure of an apparatus to prevent illegal use disclosed in Korean Laid-Open Patent Application No. 2002-71268. The apparatus shown in FIG. 3 comprises: a user authentication unit 302, a control apparatus unit 304, a media server connection unit 306, a database 308, and an input apparatus unit 310. The control apparatus unit 304 cuts off the path between the media server connection unit 306 and the input apparatus unit 310 according to the authentication result of the user authentication unit 302.

However, although unauthorized use by non-subscriber users can be prevented according to the invention of Korean Laid-Open Patent Application No. 2002-71268, impermissible use of legally received VOD service data through a permissible path cannot be prevented.

More specifically, if the HDD 212 can be separated from the set-top box or replaced by another in the apparatus shown in FIG. 1, the VOD service data stored in the HDD can be used for other purposes than the permissible viewing.

In some VOD services, the VOD service data stored in the HDD 212 is maintained over a predetermined period and automatically deleted so that illegal use of the contents can be prevented. However, even via this method, the VOD contents cannot be protected in case of separation of the HDD from the set-top box or replacement of the same by another.

SUMMARY OF THE INVENTION

An aspect of the present invention provides an authentication method according to which recording data to and restoring data from only an authenticated recording device is performed in a data processing apparatus having a recording medium on which data can be stored.

An aspect of the present invention also provides an authentication apparatus of a host side appropriate for the authentication method.

Another aspect of the present invention also provides an authentication apparatus of a recording device side appropriate for the authentication method. Further, an aspect of the present invention provides a recording device having the authentication method.

Additional aspects and advantages of the invention will be set forth in part in the description which follows and, in part, will be obvious from the description, or may be learned by practice of the invention.

According to an aspect of the present invention, there is provided an authentication method to ensure permissible recording of data to and/or reproducing of data from a recording device in a data processing apparatus having a host to process data and the recording device to store and reproduce the data processed or to be processed by the host. The method comprises: authenticating the recording device via the host; authenticating the host via the recording device; and performing recordation of data to and/or reproduction of data from the recording device upon determining that the host and the recording device have authenticated each other.

Further, when the data processing apparatus is turned on during the initialization process, authentication is performed, and once the host and the recording device authenticate each other, recording data to and/or reproducing data from the recording device is permitted until the data processing apparatus is turned off.

According to another aspect of the present invention, a host-side authentication apparatus to authenticate a recording device in a data processing apparatus having a host to process data and the recording device to store and reproduce data processed or to be processed by the host is provided. The host authentication apparatus comprises: a first encrypt module which encrypts a first variable using a host key allocated to the host and generates a first encrypted value; a first decrypt module which decrypts a second encrypted value provided by the recording device using the host key allocated to the host and generates a first decrypted value; and a host authentication controller which provides the first variable and the first encrypted value to the recording device and receives a second variable and the second encrypted value provided by the recording device, wherein the host authentication controller receives a response to authenticate the host as an authorized host from the recording device receiving the first variable and the first encrypted value, and provides a response to authenticate the recording device as an authorized recording device, to the recording device upon determining a condition that the second variable provided by the recording device is the same as the first decrypted value is satisfied.

According to yet another aspect of the present invention, a recording device-side authentication apparatus to authenticate a host by the recording device in a data processing apparatus having the host to process data and the recording device to store and reproduce data processed or to be processed by the host is provided. The recording device-side authentication apparatus comprises: a second encrypt module which encrypts a second variable using a recording device key allocated to the recording device and generates a second encrypted value; a second decrypt module which decrypts a first encrypted value provided by the host using the recording device key allocated to the recording device and generates a second decrypted value; and a recording device-side authentication controller which provides the second variable and the second encrypted value to the host and receives a first value and the first encrypted value provided by the host, wherein the recording device-side authentication controller receives a response to authenticate the recording device as an authorized recording device from the host receiving the second variable and the second encrypted value, and provides a response to authenticate the host as an authorized host to the host upon determining that a condition that the first variable and the second decrypted value are the same is satisfied.

According to another aspect of the present invention, a recording device to store and reproduce data processed or to be processed by a host processing data is provided. The recording device comprises: a second encrypt module which encrypts a second variable using a recording device key allocated to the recording device and generates a second encrypted value; a second decrypt module which decrypts a first encrypted value provided by the host by using the recording device key allocated to the recording device and generates a second decrypted value; and a recording device-side authentication controller which provides the second variable and the second encrypted value to the host, and receives a first value and the first encrypted value provided by the host, and receives a response to authenticate the recording device as an authorized recording device from the host receiving the second variable and the second encrypted value, and provides a response to authenticate the host as an authorized host to the host upon determining that a condition that the first variable and the second decrypted value are the same is satisfied, wherein only when the recording device-side authentication controller authenticates the host, the recording device permits recording data from the host and/or reproducing data to the host.

BRIEF DESCRIPTION OF THE DRAWINGS

The above and/or other aspects and advantages of the invention will become apparent, and more readily appreciated from the following description of the preferred embodiments, taken in conjunction with accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout.

A data processing apparatus according to an aspect of the present invention performs recording and/or reproducing operations from an authenticated recording device only when a host and a recording device authenticate each other. According to an aspect of the present invention, an open key encryption method is employed for authentication. Accordingly, when a host and a recording device are first combined, a host key and a recording device key are allocated to the host and the recording device, respectively.

According to the authentication method according to an aspect of the present invention, recording data to and restoring data from the authenticated recording device can be performed so that the recording device cannot be used when separated from the data processing device or when other recording devices are used. Accordingly, illegal use of the contents can be prevented.

For example, when the authentication method according to an aspect of the present invention is applied to the set-stop box shown in FIG. 2, the set-top box is given one of a pair of keys in an inseparable relation and the HDD is given the other, and mutual authentication can be performed only by these keys. Accordingly, VOD service data in the HDD cannot be reproduced by another data processing apparatus when the HDD is separated, and even when another HDD is attached to the set-top box, VOD service data cannot be recorded.

In addition, the authentication method according to an aspect of the present invention can be used together with an illegal use prevention apparatus described in FIG. 3 to prevent illegal use of VOD service data obtained through a permissible path.

Figure 4:
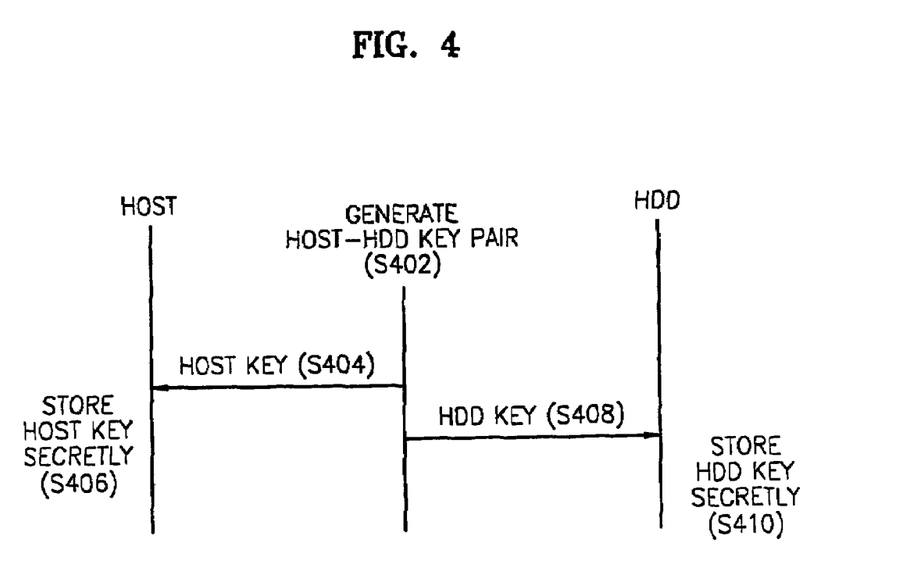
FIG. 4 is a schematic diagram of key allocation to a host and a recording device in order perform an authentication method according to an aspect of the present invention.

FIG. 4 is a schematic diagram of key allocation to a host and a recording device to perform an authentication method according to an aspect of the present invention. An example of a set-top box having an HDD according to an aspect of the present invention will be explained in the subsequent paragraphs.

The method of the present invention may be applied to a set-top box provided to a subscriber by a VOD service provider. The VOD service provider can apply the authentication method according to an aspect of the present invention in order to prevent illegal use of the contents recorded in the HDD embedded in the set-top box. More specifically, one of a pair of keys in an inseparable relation is given to the set-top box and the other to the HDD. By using the keys, the set-top box and the HDD authenticate each other, and according to the authentication result, recording and storing VOD service data in the HDD is permitted.

First, a host key and an HDD key are generated in operation s402.

The host key is provided to the host side in operation s404, and the host stores the provided host key in a memory in operation s406. At this time, in order to prevent unauthorized use of the host key, the host may encrypt the host key using an arbitrary encryption method and store the encrypted key. The encrypted host key will be used to authenticate after being decrypted by an appropriate decryption method.

The HDD key is provided to the HDD in operation s408, and the HDD secretly stores the provided HDD key in a memory in operation s410. As in the host, the HDD can also encrypt the provided HDD key and store the encrypted key.

Figure 5:
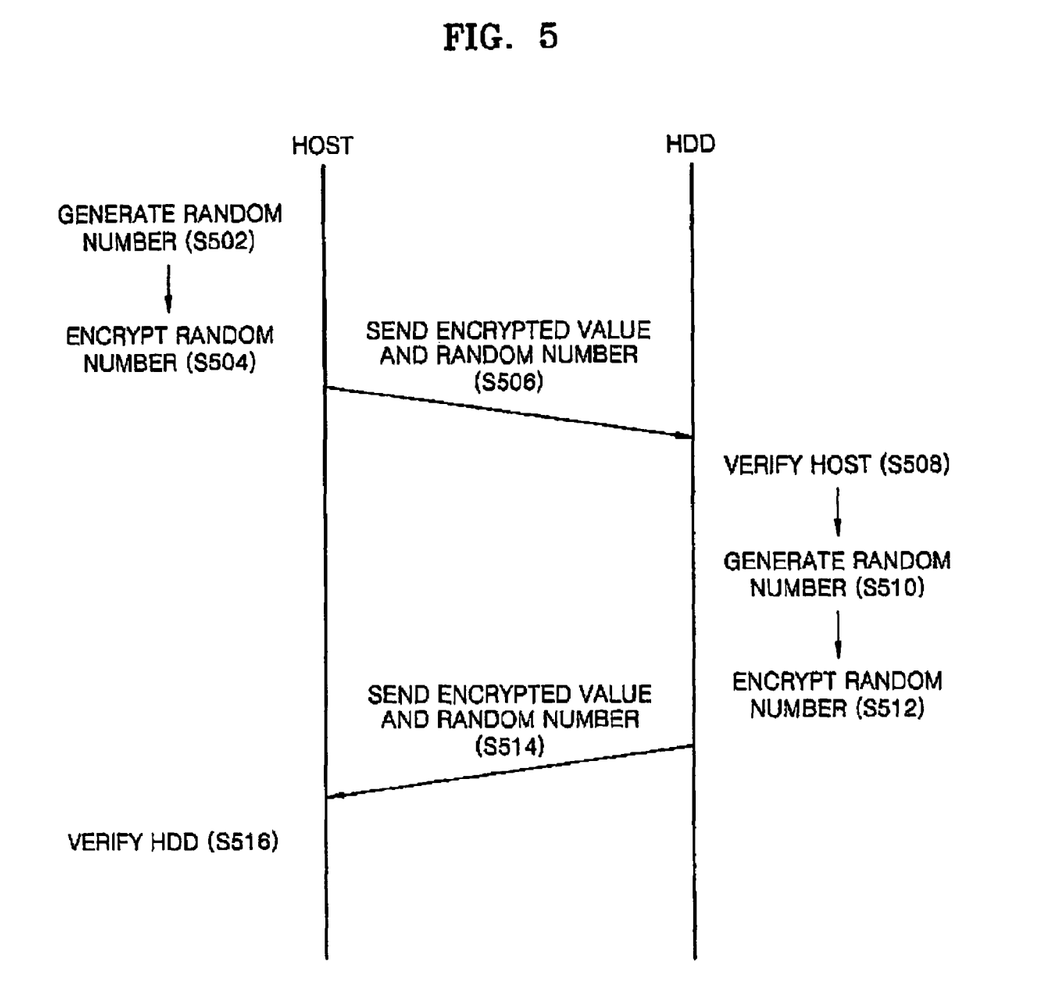
FIG. 5 is a flowchart to show an authentication method according to an aspect of the present invention.

FIG. 5 is a flowchart to show an authentication method according to an aspect of the present invention. Accordingly, an example where the host side initiates an authentication operation will now be explained. However, it should be noted that an authentication procedure initiated by the HDD can be used in the same manner.

First, the host side generates a first random number in operation s502. Here, the first random number corresponds to the first variable discussed previously and is generated by a random number generator of the host side.

The first random number is encrypted in operation s504. Here, the employed encryption method is an open key encryption method by which the first random number is encrypted by the host key granted to the host. As the result of the encryption, a first encrypted value is generated.

The host authentication controller of the host side transmits the first random number and the first encrypted value to the HDD in operation s506. The first random number and the first encrypted value will be transmitted through an advanced technology attachment (ATA interface).

The HDD authentication controller of the HDD side receives the first random number and the first encrypted value transmitted by the host and, authenticates the host using the first random number and the first encrypted value.

More specifically, the HDD decrypts the first encrypted value by the HDD key allocated to the HDD and generates a second decrypted value. Upon determining that the second decrypted value and the first random number are identical, the host is authenticated as an authorized host. Since this authentication method is well known as an open key encryption method, a detailed explanation will be omitted.

Once the host is authenticated as an authorized host, a response indicating that the host is authenticated is transmitted to the host side and the HDD follows a procedure to be authenticated by the host.

The HDD generates a second random number in operation s510. Here, the second random number corresponds to the second variable previously discussed, and is generated by a random number generator of the HDD side.

The second random number is encrypted in operation s512. The HDD authentication controller of the HDD side transmits the second random number and the second encrypted value to the host in operation s514.

The host authentication controller of the host side receives the second random number and the second encrypted value transmitted by the HDD and by using them, authenticates the HDD in operation s516.

Upon determining that the HDD is authenticated as an authorized HDD, a response indicating that the HDD is authenticated is transmitted to the HDD.

Thus, upon determining that the host and HDD are all authenticated to be authorized, then the set-top box performs recording and reproducing data in the HDD.

Here, the authentication method shown in FIG. 5 may be performed at several points in time. For example, the method can be performed before beginning a recording or reproducing session or can be performed in an initialization process after power is supplied to the set-top box.

Performing the authentication method according to an aspect of the present invention before beginning a recording or reproduction session is effective. However, considering that once the set-top box begins to operate, the HDD cannot be detached during the operation, it is preferable that the authentication method is once performed in the initialization process.

Figure 6:
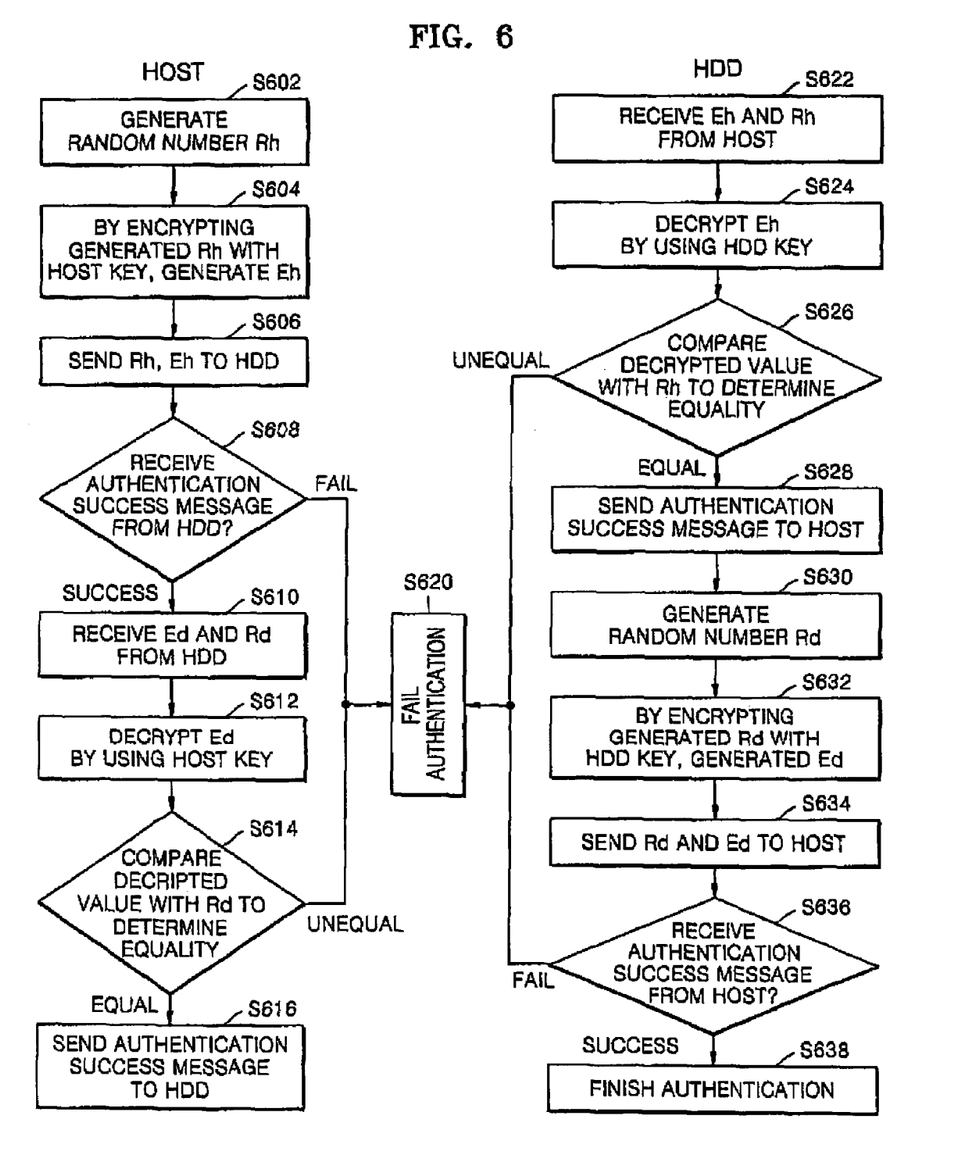
FIG. 6 is a flowchart to show details of the authentication method shown in FIG. 5.

FIG. 6 is a flowchart to show details of the authentication method shown in FIG. 5.

In FIG. 6, the process shown on the left includes the operations performed by the host, and the process shown on the right includes the operations performed by the HDD.

The authentication process in the host side is performed according to the following. The host generates a first random number, Rh, in operation s602. The host encrypts the first random number Rh by using the host key and generates a first encrypted value, Eh, in operation s604. The host authentication controller of the host side transmits the first random number Rh and the first encrypted value Eh to the HDD in operation s606. An authentication message from the HDD is received in operation s608.

Upon determining that the authentication is successful, a second random number, Rd, and a second encrypted value, Ed, from the HDD are received in operation s610. The second encrypted value Ed is decrypted by the host key in operation s612. In order to determine the equality, the decrypted value (the first decrypted value) is compared with the second random number Rd in operation s614.

Upon determining that the numbers are identical, an authentication message indicating that the authentication is successful is transmitted to the HDD in operation s616.

Meanwhile, the authentication process in the HDD side is performed as the following. The first random number Rh and the first encrypted value Eh from the host are received in operation s622. The first encrypted value Eh is decrypted by the HDD key in operation s624. By comparison, it is determined whether the decrypted value (the second decrypted value) is the same as the first random number Rh in operation s626.

Upon determining that If the numbers are identical, an authentication message to indicate that the authentication is successful is transmitted to the HDD in operation s628. The HDD generates the second random number Rd in operation s630. The HDD encrypts the second random number Rd by using the HDD key and generates the second encrypted value Ed in operation s632. The HDD authentication controller of the HDD side transmits the second random number Rd and the second encrypted value Ed to the host in operation 634. An authentication message from the host is received in operation s636.

Upon determining that the authentication is successful, the authentication process is terminated in operation s638.

When the authentication in the host and HDD has been successfully completed, then the set-top box permits recording data to and reproducing data from the HDD.

However, if in operation s608, the host does not receive the authentication message from the HDD that indicates that the authentication is successful, or in operation s614 the decrypted value (the first decrypted value) and the second random number are not identical, an authentication failure processing operation is performed in s620.

Similarly, if in the operation s626 the decrypted value (the second decrypted value) and the first random number Rh are not identical, or if in the operation s636 the HDD does not receive the authentication message from the HDD indicating that the authentication is successful, the authentication failure processing operation is performed in the s620.

When an the authentication has failed, it is impossible to record data in or restore data from the HDD. This takes place if the HDD is not the HDD originally attached to the set-top box or if the HDD is accessed by other data processing apparatuses, for example, another set-top box or a computer. All these cases fall under illegal use of VOD service data legally received. Accordingly, according to the authentication method of the present invention, illegal use of the contents can be efficiently prevented.

Figure 7:
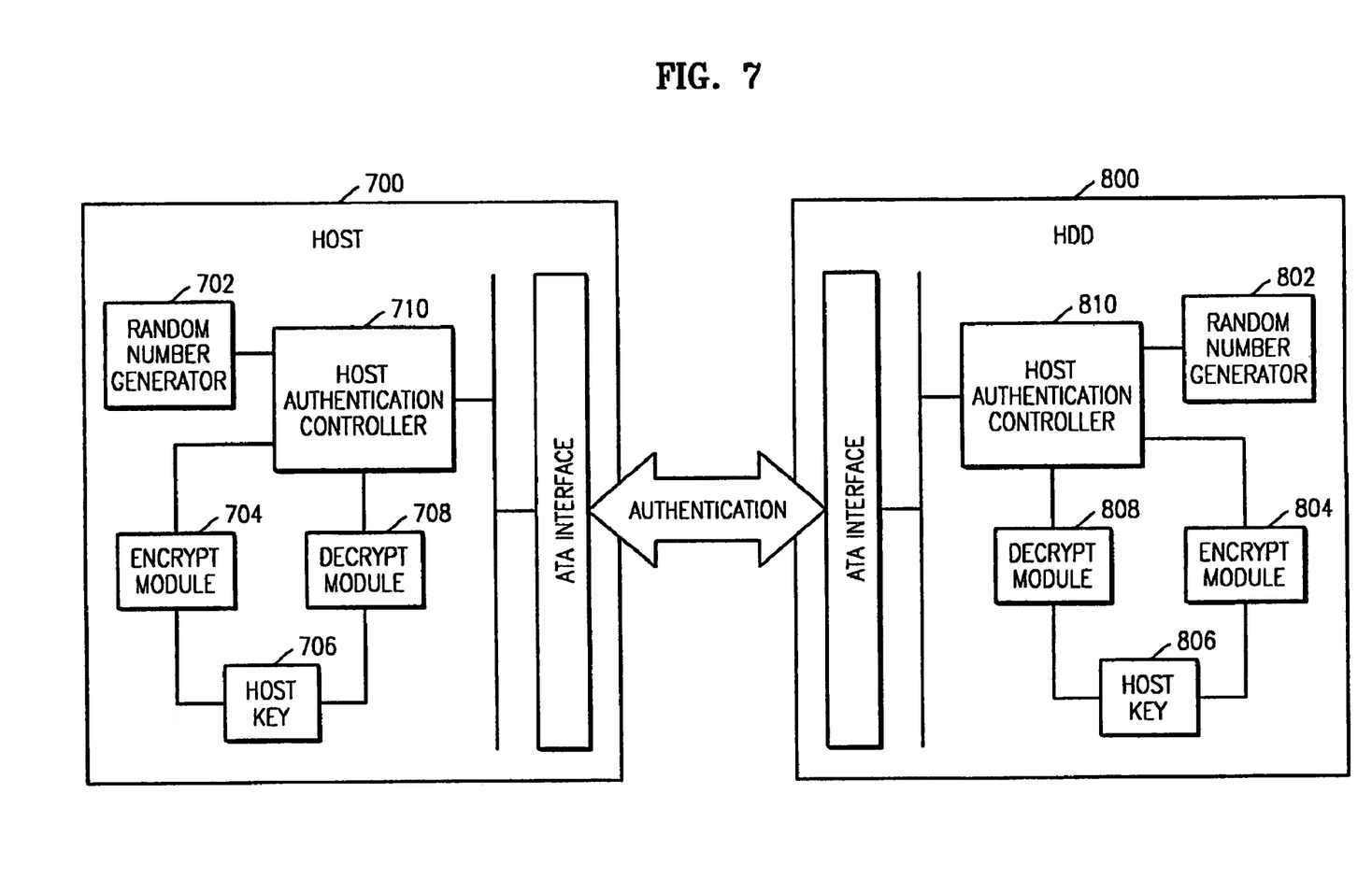
FIG. 7 is a block diagram of the structure of a host authentication apparatus and an HDD authentication apparatus according to an aspect of the present invention.

FIG. 7 is a block diagram of the structure of a host authentication apparatus and an HDD authentication apparatus according to an aspect of the present invention.

In FIG. 7, the box on the left shows the structure of the host authentication apparatus 700 and the box on the right shows the structure of the HDD authentication apparatus 800.

The host authentication apparatus 700 comprises: a first random number generator 702, a first encrypt module, a host key memory 706, a first decrypt module 708, and a host authentication controller 710.

The first random number generator 702 generates a first random number. Here, the first random number corresponds to the first variable previously discussed.

The first encrypt module 704 encrypts the first random number generated by the first random number generator. Here, the first encrypt module 704 encrypts the first random number by using the host key stored in the host key memory 706.

The first decrypt module 708 decrypts a second encrypted value transmitted by the HDD. Here, the first decrypt module 708 decrypts the second encrypted value by using the host key stored in the host key memory 706.

Since the encryption and decryption methods in the first encrypt module 704 and the first decrypt module 708 are well known by open key encryption methods, detailed explanation will be omitted.

The host authentication controller 710 transmits the first random number generated by the first random number generator 702 and the first encrypted value generated by the first encrypt module 704 to the HDD. The first random number and the first encrypted value will be transmitted through an ATA interface.

Also, the host authentication controller 710 receives the second random number and the second encrypted value transmitted by the HDD, performs authentications for the HDD, and transmits the result to the HDD.

More specifically, the host authentication controller 710 compares the first decrypted value decrypted by the first decrypt module 708 with the second random number, and upon determining that the numbers are identical, recognizes the authentication as successful. If the authentication is successful, the host authentication controller 710 generates an authentication message indicating that the authentication is successful, and transmits this to the HDD.

The HDD authentication apparatus 800 comprises: a second random number generator 802, a second encrypt module 804, an HDD key memory 806, a second decrypt module 808, and an HDD authentication controller 810.

The second random number generator 802 generates the second random number. Here, the second random number corresponds to the second variable previously discussed.

The second encrypt module 804 encrypts the second random number generated by the second random number generator 802. Here, the second encrypt module encrypts the second random number by using the HDD key stored in the HDD key memory 806.

The second decrypt module 808 decrypts the first encrypted value transmitted by the host. Here, the second decrypt module 808 decrypts the first encrypted value by using the HDD key stored in the HDD key memory 806.

The HDD authentication controller 810 transmits the second random number generated by the second random number generator 802 and the second encrypted value generated by the second encrypt module 804 to the host. The second random number and the second encrypted value will be transmitted through an ATA interface.

In addition, the HDD authentication controller 810 receives the first random number and the first encrypted value transmitted by the host, performs authentication for the host, and transmits the result to the host.

More specifically, the HDD authentication controller 810 compares the second decrypted value decrypted by the second decrypt module 808 with the first random number, and upon determining that the numbers are identical, recognizes the authentication as successful. If the authentication is successful, the HDD authentication controller 810 generates an authentication message indicating that the authentication is successful, and transmits to the host.

Only when the host successfully authenticates the HDD and the HDD successfully authenticates the host, the set-top box permits recording and/or reproducing in the HDD.

If authentication of any one failed, the set-top box does not permit the recording and/or reproducing in the HDD. Accordingly, if an HDD is not a legally authenticated HDD, it is impossible to record or reproduce VOD service data.

Similarly, only when the host successfully authenticates the HDD and the HDD successfully authenticates the host, the HDD permits recording and/or reproducing data.

If authentication of any one failed, the HDD does not permit the recording and/or reproducing data. Accordingly, if a set-top box is not a legally authenticated set-top box, it is impossible to record or reproduce VOD service data.

Here, the time when the host authentication apparatus and the HDD authentication apparatus performs authentication is flexible. For example, the authentication can be performed before beginning a recording or reproducing session or can be performed in an initialization process after power is supplied to the set-top box.

Performing the authentication process by the apparatuses shown in FIG. 7 before beginning a recording or reproduction session is effective. However, considering that once the set-top box begins to operate, the HDD cannot be detached during the operation, it is preferable that the authentication is once performed in the initialization process.

The recording device according to an aspect of the present invention comprises the HDD authentication apparatus shown in FIG. 7. Considering that most data processing apparatuses have a detachable recording device, it is more efficient that the recording device side permits to access data according to the authentication result of the host and recording device.

The authentication method according to an aspect of the present invention can be used in a set-top box, a PVR, or a PC having a storage device such that illegal use by an unauthorized user of data stored in the storage device can be prevented.

According to an aspect of the authentication method of the present invention as described above, a data processing apparatus having a recording device capable of recording and/or storing data, only when a host and the recording device authenticate each other, access to the recording device, that is, recording and/or restoring data, is enabled such that illegal use of data or use of data by an unauthorized user can be prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An authentication method to ensure permissible recording of data to and/reproducing of data from a recording device of a data processing apparatus having a host to process data and the recording device to store and reproduce data processed or to be processed by the host, the method comprising:
    allocating a host key to the host and a recording device key to the recording device, the host key and the recording device key being corresponding keys for asymmetric key encryption;
    authenticating the recording device via the host using the host key;
    authenticating the host via the recording device using the recording device key; and
    performing recording of the data to and/or reproducing of the data from the recording device upon determining that the host and the recording device have authenticated each other.

2. The method according to claim 1, wherein when the data processing apparatus is turned on during an initialization process, authentication is performed and once the host and the recording device authenticate each other, recording data to and/or reproducing data from the recording device is permitted until the data processing apparatus is turned off.

3. The method according to claim 1, wherein authentication is performed when the data processing apparatus accesses the recording device to perform a recording and/or reproducing session.

4. The method according to claim 1, wherein when the data processing apparatus and the recording device are first attached, one of a pair of keys in an inseparable relation is allocated to the host and the other to the recording device.

5. The method according to claim 4, wherein the recording of the data to and reproducing of the data from the authenticated recording device can not be performed when the recording device is separated from the data processing device or when another recording device is used.

6. The method according to claim 1, wherein the data processing apparatus is a set-top box having a recording device.

7. The method according to claim 6, wherein the recording device is a hard disc drive (HDD).

8. The method according to claim 6, wherein the recording device is a recordable optical recording device.

9. The method according to claim 1, wherein the data processing apparatus receives VOD service data.

10. The method according to claim 1, wherein the data processing apparatus is one of a PC, a digital television, a monitor, and a video processing apparatus that receives VOD service data.

11. The authentication method according to claim 1, further comprising providing a VOD service provider to perform said allocating, authenticating the recording device, and authenticating the host.

12. A host-side authentication apparatus to authenticate a recording device of a data processing apparatus having a host to process data and the recording device to store and reproduce data processed or to be processed by the host, the host authentication apparatus comprising:
    a first encrypt module to encrypt a first variable using a host key allocated to the host to generate a first encrypted value;
    a first decrypt module to decrypt a second encrypted value provided by the recording device using the host key allocated to the host to generate a first decrypted value; and
    a host authentication controller to provide the first variable and the first encrypted value to the recording device and to receive a second variable and the second encrypted value provided by the recording device, the first variable and the first encrypted value being separate and distinct from each other,
    wherein the host authentication controller receives a response to authenticate the host as an authorized host from the recording device receiving the first variable and the first encrypted value, and provides a response to authenticate the recording device as an authorized recording device to the recording device, upon determining a condition that the second variable provided by the recording device is the same as the first decrypted value is satisfied,
    wherein the host key is one of a pair of corresponding keys for asymmetric key encryption.

13. The apparatus according to claim 12, wherein authentication is performed during an initialization process performed when the data processing apparatus is turned on.

14. The apparatus according to claim 12, wherein authentication is performed when the data processing apparatus accesses the recording device for a recording and/or reproducing session.

15. The apparatus according to claim 12, wherein when the host and the recording device are first attached, the host key is allocated to the host and another one of the pair of corresponding keys is allocated to the recording device.

16. The apparatus according to claim 12, further comprising:
    a first random number generator which generates the first variable.

17. The apparatus according to claim 12, wherein the data processing apparatus is one of a PC, a digital television, a monitor, or a video processing apparatus that receives VOD service data.

18. A recording device-side authentication apparatus to authenticate a host by the recording device of a data processing apparatus having the host to process data and the recording device to store and reproduce data processed or to be processed by the host, the recording device-side authentication apparatus comprising:
   a second encrypt module to encrypt a second variable using a recording device key allocated to the recording device to generate a second encrypted value;
   a second decrypt module to decrypt a first encrypted value provided by the host using the recording device key allocated to the recording device to generate a second decrypted value; and
   a recording device-side authentication controller to provide the second variable and the second encrypted value to the host and to receive a first variable and the first encrypted value provided by the host, the first variable and the first encrypted value being separate and distinct from each other,
   wherein the recording device-side authentication controller receives a response to authenticate the recording device as an authorized recording device from the host receiving the second variable and the second encrypted value, and provides a response to authenticate the host as an authorized host to the host upon determining that a condition that the first variable and the second decrypted value are the same is satisfied,
   wherein the recording device key is one of a pair of corresponding keys for asymmetric key encryption.

19. The apparatus according to claim 18, wherein authentication is performed during an initialization process performed when the data processing apparatus is turned on.

20. The apparatus according to claim 18, wherein authentication is performed whenever the data processing apparatus accesses the recording device for a recording and/or reproducing session.

21. The apparatus according to claim 18, wherein when the host and the recording device are first attached, the recording device key is allocated to the recording device and another one of the pair of corresponding keys is allocated to the host.

22. The apparatus according to claim 18, further comprising:
   a second random number generator which generates the second variable.

23. The apparatus according to claim 18, wherein the data processing apparatus is one of a PC, a digital television, a monitor, or a video processing apparatus that receives VOD service data.

24. A recording device to store and reproduce data processed or to be processed by a host processing data, comprising:
   a second encrypt module to encrypt a second variable using a recording device key allocated to the recording device to generate a second encrypted value;
   a second decrypt module to decrypt a first encrypted value provided by the host using the recording device key allocated to the recording device to generate a second decrypted value; and
   a recording device-side authentication controller to provide the second variable and the second encrypted value to the host and to receive a first variable and the first encrypted value provided by the host, and receives a response to authenticate the recording device as an authorized recording device from the host receiving the second variable and the second encrypted value, and provides a response to authenticate the host as an authorized host to the host upon determining that a condition that the first variable and the second decrypted value are the same is satisfied, the first variable and the first encrypted value being separate and distinct from each other,
   wherein only when the recording device-side authentication controller authenticates the host, the recording device permits recording data from the host and/or reproducing data to the host, and
   wherein the recording device key is one of a pair of corresponding keys for asymmetric key encryption.

25. The apparatus according to claim 24, wherein authentication is performed during an initialization process performed when the data processing apparatus is turned on.

26. The apparatus according to claim 24, wherein authentication is performed whenever the data processing apparatus accesses the recording device for a recording and/or reproducing session.

27. The apparatus according to claim 24, wherein when the host and the recording device are first attached, the recording device key is allocated to the recording device and another one of the pair of corresponding keys is allocated to the host.

28. The apparatus according to claim 24, further comprising:
   a second random number generator which generates the second variable.

29. A method to authenticate permissible recording and/or reproducing of data in a data processing apparatus having a host and a recording device, comprising:
   allocating a host key to the host and a recording device key to the recording device, the host key and the recording device key being corresponding keys for asymmetric key encryption;
   authenticating the recording device using the host key;
   authenticating the host using the recording device key; and
   recording data and/or reproducing upon authentication of the recording device and the host.

30. The method according to claim 29, wherein an encryption technique is used to authenticate the recording device and/or the host.

31. The method according to claim 29, wherein the data processing apparatus is a set-top box having a recording device.

32. The method according to claim 31, wherein the recording device is a hard disc drive (HDD).

33. The method according to claim 32, further comprising:
   assigning one key to the set-top box and assigning another key to the hard disk drive to allow the set-top box and the hard disk to authenticate each other.

34. The method according to claim 29, wherein the recording of the data to and the reproducing of the data from the authenticated recording device can not be performed when the recording device is separated from the data processing device or when another recording device is used.

35. The method according to claim 29, wherein the authentication operations are performed during an initialization process performed when the data processing apparatus is turned on.

36. The apparatus according to claim 29, wherein authentication is performed when the data processing apparatus accesses the recording device for a recording and/or reproducing session.

37. A host-side authentication method to authenticate a recording device of a data processing apparatus having a host, comprising:
- generating a first random number via the host;
- encrypting the first random number to generate a first encrypted value;
- transmitting the first random number and the first encrypted value to the recording device, the first random number and the first encrypted value being separate and distinct from each other;
- receiving a second random number and a second encrypted value from the recording device;
- decrypting the second encrypted value to generate a first decrypted value; and
- authenticating the host upon determining that the second random number provided from the recording device is the same as the first decrypted value,
- wherein the encrypting and the decrypting use corresponding keys for asymmetric key encryption.

38. A host-side authentication apparatus to authenticate a recording device of a data processing apparatus having a host to process data and the recording device to store and reproduce data processed or to be processed by the host, the host authentication apparatus comprising:
- a first encrypt module to encrypt a first variable using a host key allocated to the host to generate a first encrypted value;
- a first decrypt module to decrypt a second encrypted value provided by the recording device using the host key allocated to the host to generate a first decrypted value; and
- a host authentication controller to provide the first variable and the first encrypted value to the recording device and to receive a second variable and the second encrypted value provided by the recording device, the first variable and the first encrypted value being separate and distinct from each other,
- wherein the host authentication controller receives a response to authenticate the host as an authorized host from the recording device receiving the first variable and the first encrypted value, and provides a response to authenticate the recording device as an authorized recording device to the recording device, upon determining a condition that the second variable provided by the recording device is the same as the first decrypted value is satisfied,
- the first variable and the first encrypted value are provided in a same operation, and
- the second variable and the second encrypted value are provided in a same operation.

* * * * *

UNITED STATES PATENT AND TRADEMARK OFFICE
CERTIFICATE OF CORRECTION

| | | |
|---|---|---|
| PATENT NO. | : 7,620,813 B2 | Page 1 of 1 |
| APPLICATION NO. | : 10/875677 | |
| DATED | : November 17, 2009 | |
| INVENTOR(S) | : Park et al. | |

It is certified that error appears in the above-identified patent and that said Letters Patent is hereby corrected as shown below:

Title Page, Column 2 (Other Publications), Line 1, change "Appied" to --Applied--.

Title Page, Column (Abstract), Line 5, change "and/reproducing" to --and/or reproducing--.

Column 9, Line 38, change "and/reproducing" to --and/or reproducing--.

Signed and Sealed this

Second Day of February, 2010

David J. Kappos
*Director of the United States Patent and Trademark Office*